United States Patent [19]

Asmus

[11] 4,304,039

[45] Dec. 8, 1981

[54] METHOD AND AN ARTICLE FOR JOINING ARTICLES

[76] Inventor: James F. Asmus, Rte. 1, Box 46A, East Liberty, Ohio 43319

[21] Appl. No.: 72,836

[22] Filed: Sep. 6, 1979

Related U.S. Application Data

[60] Continuation of Ser. No. 928,286, Jul. 26, 1978, abandoned, which is a continuation of Ser. No. 690,028, May 28, 1976, abandoned, which is a division of Ser. No. 472,052, May 21, 1974, Pat. No. 3,964,879, and a continuation-in-part of Ser. No. 224,569, Feb. 8, 1972, abandoned.

[51] Int. Cl.³ .................... B21D 39/00; B23P 11/00; F16B 39/02; F16B 39/28
[52] U.S. Cl. .................................. 29/505; 29/526 R; 411/259; 411/311; 411/411; 411/452
[58] Field of Search ............ 29/505, 521, 509, 526 R; 85/19, 22; 151/14.5, 22

[56] References Cited

U.S. PATENT DOCUMENTS

| | | | |
|---|---|---|---|
| 1,891,895 | 12/1932 | Nagel | 85/19 X |
| 2,842,180 | 7/1958 | Brown et al. | 151/22 |
| 3,477,334 | 11/1969 | Stone et al. | 85/19 X |

FOREIGN PATENT DOCUMENTS

| | | | |
|---|---|---|---|
| 459875 | 10/1950 | Italy | 151/22 |
| 482272 | 6/1937 | United Kingdom | 151/22 |
| 533761 | 2/1941 | United Kingdom | 151/22 |

Primary Examiner—Charlie T. Moon
Attorney, Agent, or Firm—Finnegan, Henderson, Farabow, Garrett & Dunner

[57] ABSTRACT

A concept of joining two articles where one member has a plurality of ridges with the valleys between the ridges having a constant cross-sectional area but a sequentially varying cross-sectional shape so when such a member is inserted into a cavity having approximately the same cross-sectioned area, material in interference with the ridges flows into the valleys and upon further insertion into the cavity the material within the valleys is deformed in a direction lateral to the direction of insertion so as to join the two articles.

8 Claims, 4 Drawing Figures

METHOD AND AN ARTICLE FOR JOINING ARTICLES

CROSS REFERENCE TO RELATED APPLICATION

This is a continuation application of U.S. patent application Ser. No. 928,286, now abandoned, which is a continuation application of U.S. patent application Ser. No. 690,028, now abandoned, which is a continuation-in-part application of U.S. patentapplication Ser. No. 224,569 filed Feb. 8, 1972, now abandoned, and a divisional application of U.S. patent application Ser. No. 472,052 filed May 21, 1974, now U.S. Pat. No. 3,964,879 issued June 22, 1976.

SUMMARY OF THE INVENTION

This invention relates to a concept for the design of the first of two close-fitting articles so that upon forced mating with the second article, material deformation occurs in the second article in such a manner that the deformation must be reversed to accomplish separation thus causing the mated articles to be restrained from separation by a resistance which is dependent on the plastic properties of the second article rather than the frictional resistance between the two articles.

The design concept envisions in one embodiment the first article bestowed, on at least one of its mating surfaces, with two or more ridges substantially parallel to the path of engagement of the articles and with an area between each pair of ridges hereinafter referred to as a groove which is of substantially constant cross-sectional area but of varying cross-sectional shape over some portion of the length of engagement. During mating of the articles, material of the second article is introduced into one end of the groove or grooves of the first article and, as engagement proceeds, is deformed to comply with the valley cross-sectional shape over the engaged length. As the groove cross-sectional shape varies along the groove length, the second article may no longer be separated from the first article without reversal of the second article deformation. The concept envisions the first article shaped in any of several forms including planar, cylindrical, rectangular, hexagonal, square, and triangular members having ridges and groove on one or more of the article surfaces. The present invention further envisions that, when dis-assembly and re-assembly are desirable, the grooves of the first article can be configured so that a substantial portion of the deformation of the second article occurs within the range of plastic deformation or flow of the material of the second article. The present invention further envisions groove designs which, during mating, cause reversal in the direction of the deformation of the material of the second article. Another embodiment of the invention adapted for use with a threaded member would have a portion of the member with the ridges defining an Archmedes spiral forming grooves or regions therebetween with the regions varying in cross-sectional shape while having a constant cross-sectional area.

It is an object of the invention to provide a simple means of fastening two articles with the separation being characterized as requiring the application of substantial separating force.

It is another object of the invention to provide a means of fastening two articles in a manner that separation is not abrupt or catastrophic, and where the force needed to effect separation does not diminish suddenly once the separation is initiated but decreases at a relatively constant rate until there is a complete separation.

DETAILED DESCRIPTION OF THE DRAWINGS

Figure 2:
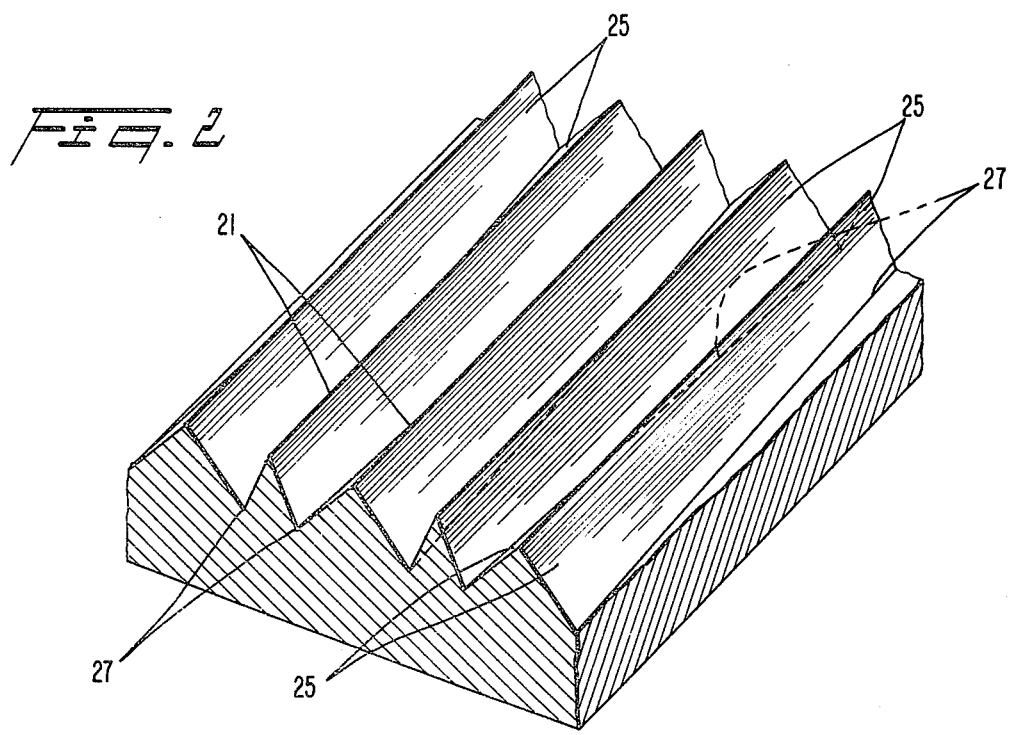
FIG. 2 is an elevated view of a rectangular male member utilising the present invention.

FIG. 2 is an embodiment of the present invention with the ridges 21 and grooves 27 formed on a planar surface. Such a member need not have all surfaces so shaped and as shown only one surface has the ridges and grooves to induce material deformation upon insertion.

In this embodiment it can be seen that the surfaces 25 are not planar but are best described as being warped or twisted plane surfaces. The cross-sectional area of the grooves remains substantially constant the length of the member while the change in cross-sectional shape of the grooves induces metal flow in a direction lateral to the insertion direction that creates the substantial resistance to extraction.

Upon insertion of the member into the cavity the interference between the ridges and the cavity walls induces material to flow axially in the direction of insertion and accumulate just ahead of the advancing member. Some of the metal is induced by the ridges to flow laterally toward the grooves where the shape of the grooves induces further lateral material flow upon continued insertion that results in the joining of the two articles. Members having a 45° chamfer were found to induce large amounts of axial material flow in addition to the lateral material flow except where the cross-sectional area of the cavity was greater than that of the member inserted thereby reducing the interference between the cavity walls and the entry portion of the member. Where the cavity area was equal to or less than the area of the member, a joining took place; however, excessive axial material flow was induced resulting in high insertion forces.

Except when a male member is completely encased in a "cavity" the total area of the member in relation to the cavity does not indicate if the grooves between the ridges will be filled completely.

In order to define the relative deformation in both embodiments, it is necessary to use the volume of material desplaced by the ridges and the volume between the ridges available to accommodate the displaced material. Where the volume of metal displaced by the ridges is greater than the volume of the available space between the ridges, then the excess metal will flow in the direction of insertion. Where the volumes are substantially equal, then the material flow will be primarily lateral and the resulting union will have a high resistance to extraction as well as requiring a low insertion force. When the volume of displaced material is substantially less than the volume available between the ridges, then the extraction force will be reduced since the material flow induced by extraction is less than when the volume between the ridges is full of deformed metal.

The smaller chamfer angles result in more lateral material flow in relation to axial flow and therefore exhibited a lower insertion force and a stronger union of the two articles. Chamfer angles of about 20° have been used with the resulting union being of high strength and it would appear that the more efficiently the material in interference with the ridges upon insertion can be directed to the grooves (i.e., minimizing axial metal flow), the stronger the resuling union between the two articles and the lower the required insertion force.

The strength of the resulting union is measured by the force required to extract the member from the cavity after it has been inserted. Surprisingly, the force required to extract the inserted member does not diminish catastrophically after extraction is initiated. The following table shows the insertion and extraction loads of a hardened steel member forced into a cylindrical cavity of approximately the same area ($\sim 0.6$ in$^2$) within a mild steel (1020) plate.

The table illustrates that the primary force holding the member within the cavity after insertion is the metal within the grooves 27 that must flow laterally if the member is to be inserted further or extracted. The amount of lateral material flow is proportional to the depth of insertion, however, as the table illustrates, the force required to remove the member does not decrease suddenly upon application of an extracting force but retains a relatively high restraining force until the depth of insertion is minimal whereupon the member is then suddenly extracted from the cavity.

TABLE 1

| Fastener Position in Hole | Loads, lb., for Fastener Insertion and Removal (a,b) | |
|---|---|---|
| inch | Insertion | Removal |
| (Entry) | | |
| 0.01 | 2,000 | — |
| 0.02 | 3,000 | — |
| 0.1 | 12,000 | — |
| 0.2 | 19,000 | — |
| 0.3 | 24,000 | 2,000 |
| 0.4 | 26,000 | 3,000 |
| 0.5 | 29,000 | 4,000 |
| 0.6 | 31,500 | 4,000 |
| 0.7 | 33,000 | 5,000 |
| 0.8 | 34,000 | 5,500 |
| 0.85 | 34,000 | 6,000 |
| 0.90 | 33,000 | 7,000 |
| 0.99 | 29,500 | 7,000 |
| 1.0 | 29,000 | — |

(a) Insertion and removal speeds were 0.2-inch per minute
(b) Cavity ridge transition The initial size of the cavity affects both the required insertion force and the load required for extraction. If the cross-sectional area of the cavity is less than that of the cross-sectional area of the member, then the insertion will induce substantial axial material flow as well as the lateral flow that provides the locking engagement. This unnecessarily increases the insertion force without the benefit of increasing the extraction force. The present invention is clearly operable using such a cavity as long as the material defining the cavity can accommodate, by material flow, the insertion of the member as well as remain intact under the required insertion forces. Where the cross-sectional area of the cavity is approximately equal to that of the member, the induced flow is substantially lateral and the resulting union of the member within the cavity exhibits a high extraction force. The area of the cavity may be greater than the area of the member with the insertion load decreasing as the cavity becomes larger for a given member. The induced material flow is primarily lateral; however, if the area of the cavity is greater than the area of the member inserted therein by approximately 10 percent, the extraction load is reduced since the grooves are not completely full of cavity material and the amount of material to be moved during extraction is reduced.

Figure 3:
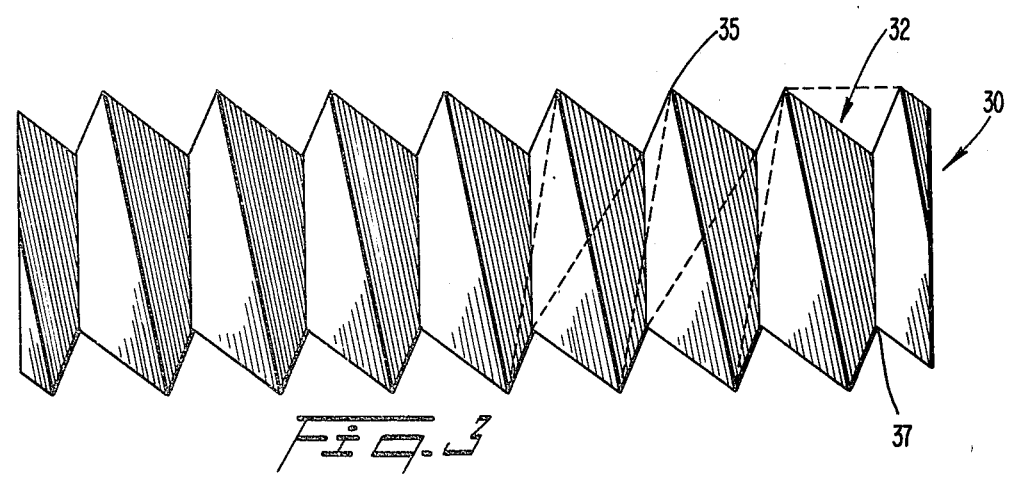
FIG. 3 shows a side view of a section of a threaded member using one embodiment of the present invention.
Figure 4:
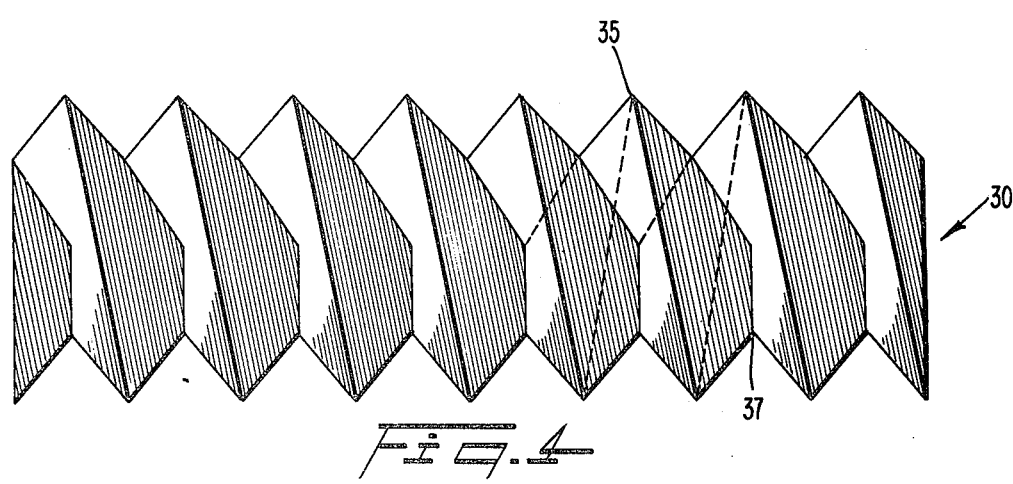
FIG. 4 shows a side view of the member of FIG. 3 at a different side where the advance of the thread root is reversed so as not to advance excessively into the adjacent ridge.

FIGS. 3 and 4 disclose an embodiment of the invention adapted for use on a threaded member 30. FIGS. 3 and 4 necessarily exaggerate this embodiment for the sake of clarity. In FIG. 3 the threaded member 30 has a portion of the member where the regions 32 between the ridges 35 forming the Archmedes spiral vary in cross-sectional shape but have a constant cross-sectional area. Just as with the other embodiments of the invention the variation of cross-sectional shape is sequential and of sufficient magnitude to induce material flow in the article surrounding the member. By contrast to the embodiment of FIG. 2 the embodiments of FIGS. 3 and 4 and the locking portion 12 of FIG. 1 have a sequentially varying shape perpendicular to the direction of insertion of the member. Similar to the other embodiments of the invention the variation in cross-sectional shape is sequential in a direction parallel to the ridges on the member. The invention operates in the same manner in the threaded embodiments, however in those embodiments the direction of insertion of the member is perpendicular to the direction of movement between the surface of the threaded member and the surrounding member forming a cavity. By contrast, the embodiment of FIG. 2 has the direction of insertion for the member parallel to the direction of movement between the surface of the member and the surrounding member.

Figure 1:
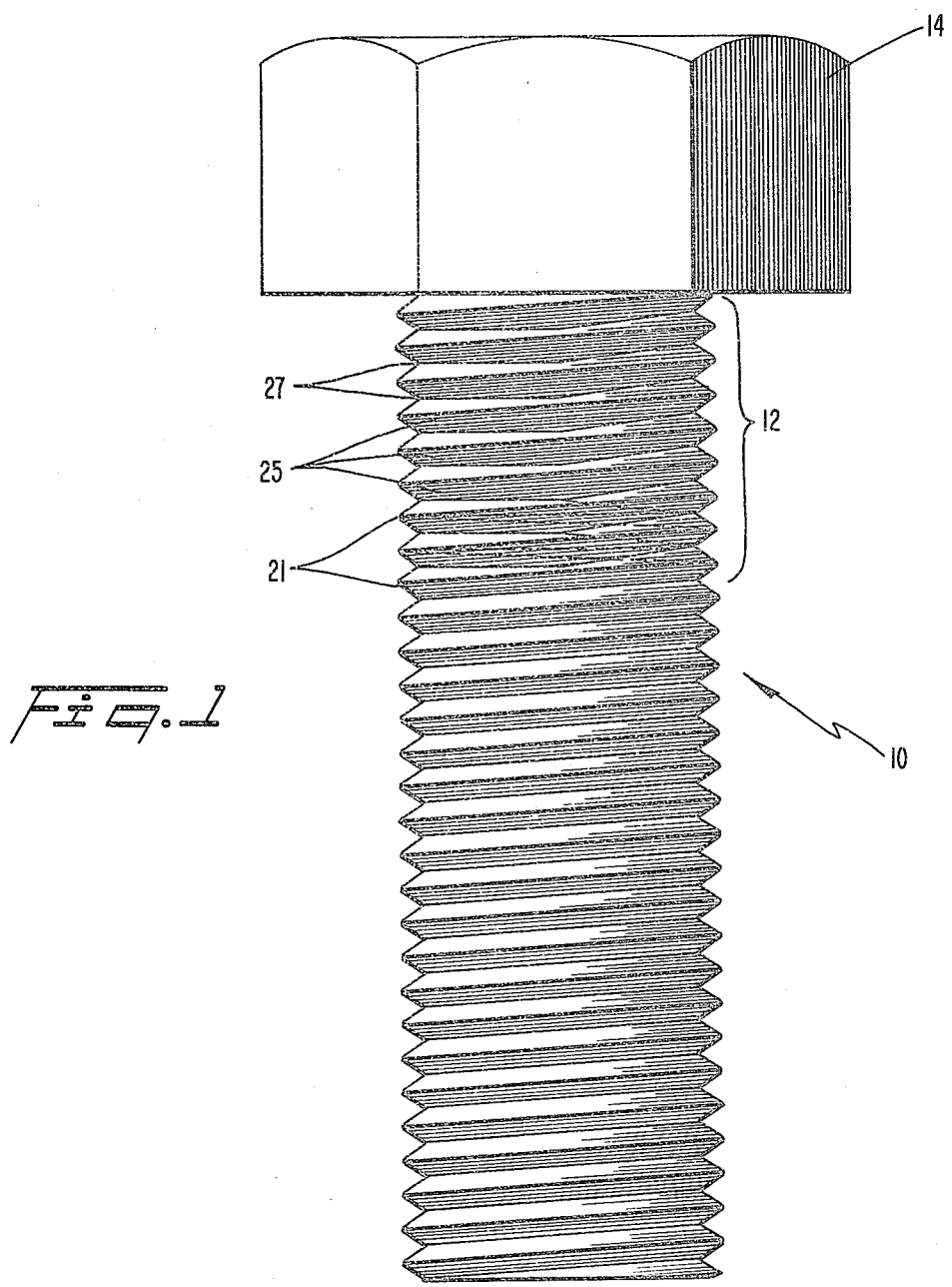
FIG. 1 is a side view of one embodiment of a threaded fastener having a locking portion.

The threaded embodiment finds particular utility in increasing the torque resistance of a conventional threaded member having a portion of the member with a configuration as previously described. The variation in cross-sectional shape between ridges on a threaded member can be made sufficient to produce a self-locking fastener. As shown in FIG. 1, a preferred embodiment of this invention would have the locking portion 12 (the portion having variation in cross-sectional shape between ridges) adjacent or abutting the means 14 of turning the threaded fastener 10 so the locking portion of the member will engage the threaded cavity surrounding the member just upon complete insertion of the threaded member into the cavity. The locking portion 12 has ridges 21 and grooves 27 running substantially perpendicular to the longitudinal axis of member 10. The ridges 21 are defined by the intersection of the surfaces 25 and where the surfaces 25 intersect between ridges 21 they form grooves 27 which may have characteristics as described in relation to FIGS. 3 and 4. Since most conventional machine threads form triangular regions between adjacent ridges a preferred embodiment of the invention would have such triangular regions varying in cross-sectional shape although the invention is applicable to non-triangular (eg. round, square) thread forms.

In FIG. 3 the variation of cross-sectional shape of the regions 32 is accomplished by advancing the thread root 37 at a rate substantially different than that of the ridges 35. In a preferred embodiment the difference in advance between the Archimedes spiral of the ridges 35 and the thread root 37 would be such that a line formed by the intersection of adjacent ridges (ie the thread root) is at an angle less than 10 degrees from line defined by the ridges.

FIG. 4 shows another side of the same member of FIG. 3 where the rate of advance of the thread root is reversed so as not to advance completely into the adjacent ridge. While this figure shows the reversal at a regular interval on the member that is not essential.

The remaining portion of the disclosure relates to the invention in all embodiments however it should be noted that the following disclosure only relates to that portion of the threaded member that is disposed to induce material flow in the surrounding material with the sequential variation in cross-sectional shape between ridges.

Since the forces resisting insertion are generated by resistance to material flow within the grooves, the material defining the second member or cavity must be ductile to assure ready insertion. While the ductility may be induced by local heating or may be inherent in the material, clearly the material surrounding the member must flow into the grooves on the member and be further deformed by the grooves as the member is inserted. When the cavity is in a relatively non-ductile material, it can be serrated or broached to a cross-sectional shape matching the cross-sectional shape of the member at its entry end. In this manner the relatively large material flow normally associated with the insertion of the member, due to the deflection of material on each side of the ridge 21, is minimized and substantially all material flow is lateral within the grooves 27. In addition, the change in cross-sectional shape of the grooves may be small for relatively non-ductile material so as to limit the deformation to an amount below that which would induce cracking of the material deformed within the grooves upon insertion.

For the purposes of this invention it should be understood that a "ductile" material exhibits at least a 10 percent elongation in a conventional tensile test while a "relatively ductile" material exhibits between 5 percent and 10 percent elongation in such a test. A material having a ductility less than 5 percent is brittle and the deformation required to provide the joining must be limited.

This can be accomplished using the concept of the present invention by limiting the change in groove shape between the ridger or using large members of relatively small ridges that require only minimal lateral movement of material into the areas between the ridges.

The figures illustrate only one means of forming grooves between the ridges having a constant cross-sectional area and sequentially changing cross-sectional shape. The material within the grooves so formed is deformed laterally on insertion and extraction thereby joining the two articles. The angular inclination of the nonparallel grooves affects the amount of induced circumferential metal flow. Angular inclination of the groove is defined as the angle between the root of the groove between the ridges and the longitudinal axis of the ridge itself. The typical application for the invention will be operable with a very small angle between the grooves and the adjacent ridge though such grooves would generate little circumferential metal flow and the union between the members would not be strong. This could be adequate in some applications or the member could be made long thereby causing a larger amount of material to deform over the length of the inserted member that would flow and resist extraction of the inserted member. If the angular inclination is large, then the insertion force will be increased and the material defining the cavity must have sufficient ductility to withstand large amounts of induced circumferential flow.

While the invention is clearly operable over a broad range of groove inclination, it is evident that where the angle between the root of the groove and the longitudinal axis of the ridge is less than 10 degrees the invention will show the optimum conbination of low insertion force and high extraction force without requiring use of a material having unusually high ductility or for preforming the cross-section of the cavity.

It should be understood that the preceding description has shown several embodiments of the present invention and modifications may be made to such embodiments that will remain within the scope of the invention and the appended claims.

I claim:

1. A method of increasing the torque resistance of an elongated threaded fastener comprising: threading said fastener into a female threaded member and inducing significant material flow in said female threaded member, said material flow being primarily in a direction parallel to the direction of insertion of said fastener, said material flow being induced by providing a groove between successive ridge portions of a spiral ridge on said fastener with said groove having a constant cross-sectional area and sequentially varying cross-sectional shape.

2. The method of claim 1 wherein said material flow is induced by having the rate of advance of the root of said groove differ substantially from the rate of advance of said ridge.

3. A threaded fastener including a threaded portion, said threaded fastener further including a locking portion disposed to increase the torque resistance of said fastener when it is inserted into threaded material surrounding said fastener, said locking portion including means for inducing significant flow of said material surrounding said fastener with said flow being primarily in a direction of insertion of said fastener, said flow inducing means comprising a helical ridge formed of a plurality of axially spaced ridge portions, said ridge portions being at an acute angle to the direction of insertion of said fastener, said ridge portions forming a threadlike portion on said fastener with a groove-like region between successive ridge portions, said groove-like region having a constant cross-sectional area and a sequentially varying cross-sectional shape.

4. The fastener of claim 3 wherein the rate of advance of said ridge portions differs significantly from the rate of advance of the root of said groove-like regions.

5. On a threaded fastener including an elongated threaded portion defined by a helical ridge, the improvement comprising:
a locking portion on said threaded portion, said locking portion being comprised of a helical ridge formed of a plurality of adjacent axially spaced ridge portions, said ridge being substantially parallel to the ridge of the threads on said threaded portions, said groove in said locking portion having a constant cross-sectional area and a sequentially varying cross-sectional shape, the magnitude of said variation in cross-sectional shape being sufficient to produce locking of said fastener when said fastener is inserted in a threaded article.

6. The fastener of claim 5 where said threaded fastener includes means for turning said fastener and said locking portion abuts said turning means.

7. The fastener of claim 5 where said groove between said ridge is approximately triangular.

8. The fastener of claim 7 where the root of said triangular groove between adjacent portions of said ridge is at an angle less than 10 degrees from said ridge.

* * * * *